US00RE34323E

United States Patent [19]

Heikkinen

[11] E Patent Number: Re. 34,323

[45] Reissued Date of Patent: Jul. 27, 1993

[54] PACKAGING FILM PRODUCT

[75] Inventor: Veijo Heikkinen, Mänttä , Finland

[73] Assignee: Amerplast OY, Tampere, Finland

[21] Appl. No.: 497,305

[22] Filed: Mar. 22, 1990

Related U.S. Patent Documents

Reissue of:

[64] Patent No.: 4,732,272
Issued: Mar. 22, 1988
Appl. No.: 830,582
Filed: May 3, 1985

[51] Int. Cl.[5] ..... B65D 71/00

[52] U.S. Cl. ..... 206/391; 206/390; 206/410; 206/806; 229/87.04

[58] Field of Search ..... 206/0.8, 215, 225, 226, 206/303, 440, 445, 497, 389, 390, 391, 394, 860; 229/87.01, 87.2, 87.04; 383/10, 119

[56] References Cited

U.S. PATENT DOCUMENTS

| | | | |
|---|---|---|---|
| 1,939,794 | 12/1933 | Seybold et al. | 229/87.2 |
| 1,998,989 | 4/1935 | Greve | 229/87.01 |
| 2,360,931 | 10/1944 | Brockman | 229/117.14 |
| 2,805,791 | 9/1957 | Arneson | 229/117.14 |
| 2,829,817 | 4/1958 | Halpern | 229/117.14 |
| 2,975,934 | 3/1961 | Powell | 229/117.14 |
| 2,996,179 | 8/1961 | Osterman | 206/410 |
| 3,199,756 | 8/1965 | Davy | 206/390 |
| 3,430,845 | 3/1969 | Susuki et al. | 229/87.04 |
| 3,462,069 | 8/1969 | Suominen | 383/10 |
| 3,730,418 | 5/1973 | Spencer | 229/117.14 |
| 3,863,837 | 12/1975 | Spiegel et al. | 229/164 |
| 4,234,086 | 11/1980 | Dorton | 206/806 |
| 4,291,807 | 9/1981 | Giordano et al. | 206/806 |
| 4,456,122 | 6/1984 | Kalal | 206/806 |

FOREIGN PATENT DOCUMENTS

| | | | |
|---|---|---|---|
| 2702958 | 7/1978 | Fed. Rep. of Germany | 206/410 |
| 1513052 | 2/1968 | France | 383/10 |
| 0395021 | 12/1965 | Switzerland | 383/119 |
| 1141841 | 2/1969 | United Kingdom | 383/10 |

*Primary Examiner*—Jimmy G. Foster
*Attorney, Agent, or Firm*—Pollock, Vande Sande & Priddy

[57] ABSTRACT

Packaging film product for the packaging of paper rolls or equivalent into a consumer package provided with a handle. The packaging film product consists of a web-like film (1) wherein the edge borders (1a, 1b) of the film are folded towards each other over the middle portion of the film remaining between them, substantially over equal distances so that the edge borders cover a substantial part of the middle portion that remains in between. At one edge of the web folded in this way, a longitudinally handle strip (2) has been produced by joining together the film layers that are placed one above the other, and grasping openings (3) or opening blanks have also been made into the handle strip with a mutual spacing corresponding to the spacing of the package units.

6 Claims, 1 Drawing Sheet

PACKAGING FILM PRODUCT

Matter enclosed in heavy brackets [ ] appears in the original patent but forms no part of this reissue specification; matter printed in italics indicates the additions made by reissue.

The present invention is concerned with a packaging film product for the packaging of paper rolls or other products into consumer packages containing one or, preferably, several product units and provided with a handle. The packaging film product concerned is meant expressly for mechanized production of consumer packages, wherein the product units are packaged automatically into consumer packages that contain a certain number of product units and that are provided with a handle. In the first place, the film is suitable for automatic packaging of small paper rolls, such as towel paper rolls or toilet paper rolls, into consumer packages. It may, however, also be applied to the production of group packages for other products.

It is in particular various paper roll products that are packaged into consumer packages that, as a rule, contain 2, 4, 6, 8 or 12 rolls by wrapping the rolls as a relatively tight bundle into a plastic film wrapping. In this way, the package becomes tidy, and it is relatively easy to handle in the store. However, it is a problem of the said prior-art packages that they occupy an unduly large space in the shopping bag of the consumer, relative their weight, even though they in themselves, being ready packages, could also be carried separately if the package had some sort of a handle member for this purpose.

A solution has been sought for the said problem in the Finnish Patent Application No. 840900 by means of the package production method described therein, in which a handle portion is provided for the ultimate package as a part of the production of the package. The use of the said method, however, causes its arrangements of additional devices in the packaging equipment even though in this way quite a usable package is achieved.

In the present invention, a solution has been sought for the said handle problem of the package out of a different starting point, as compared with the method described in the said Patent Application No. 840900. In the present invention, the starting point has been the packaging film itself, wherein attempts have been made to make the film such that, in spite of processability by means of conventional packaging equipment, the film provides a package with a handle without additional equipment or operations proper, in the packaging process itself. This objective has been reached by means of a packaging film product or preparation, whose essential characteristics come out from the accompanying claim 1.

The invention will be described by means of the attached drawing, wherein

The packaging film product in accordance with the invention has been produced, e.g., as plastic film web 1 or as some other suitable film web so that the edge border 1a and 1b of the web 1 have been folded as substantially equal widths towards each other onto the middle area of the web so that the edge borders cover at least a substantial proportion of the middle area of the web. At one edge of the folded, two-fold web, a longitudinal handle strip 2 has been formed by joining the film layers, placed one above the other, together. Into the said handle strip, grasping openings 3 or opening blanks have been prepared with a spacing corresponding to the spacing of the package units.

Figure 3:
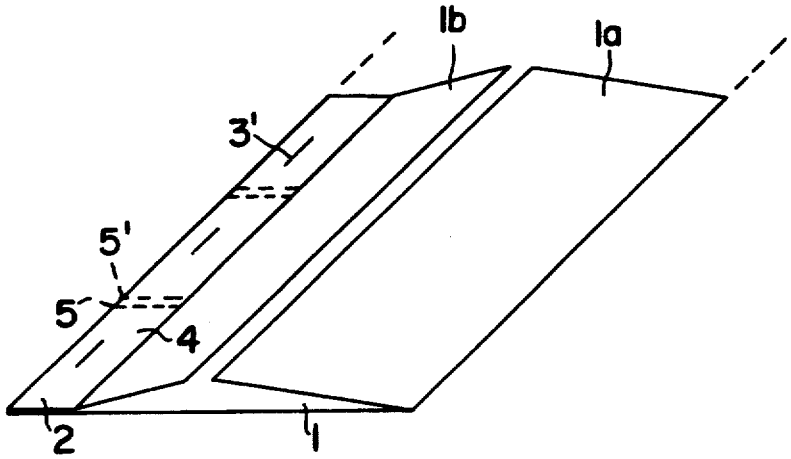

The handle strip 2 may be prepared e.g., by means of hot sealing 4. In stead of heat sealing, it is, of course, also possible to use other modes of joining, such as glueing. The grasping openings 3 may be prepared, e.g., by means of an appropriately heated tool so that the film layers adhere to each other at the edge portions of the opening, whereby a firm and tidy grasping opening is provided. Alternatively, the openings 3 may be just perforated tear-off openings. As adequate grip is also provided by means of a longitudinal linear cut or linear tear perforation prepared in stead of the opening 3 as shown in FIG. 3 in FIG. 3.

The borders 1a and 1b can be extended across the middle area of the web 1 either so that they meet substantially in the middle of the middle area, or so that a space remains between the borders. The said intermediate space may be filled, e.g., with a loose film strip of a width equal to the width of the said space, so that the film product package, to be rolled or folded, becomes of equal thickness over its entire width.

Figure 1:
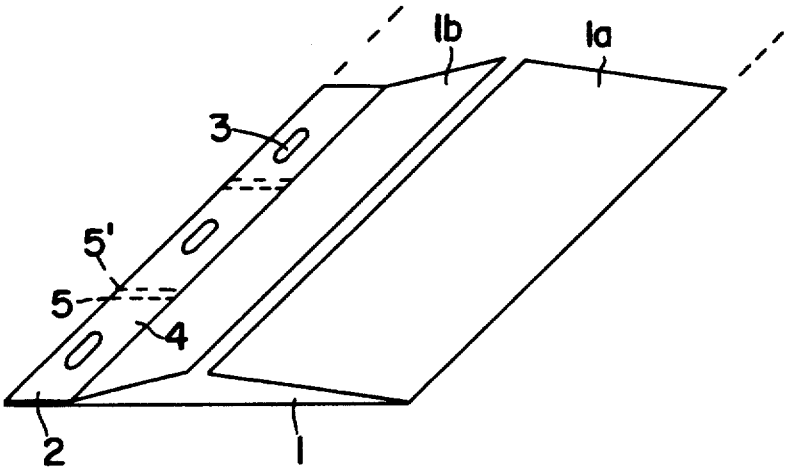
FIG. 1 illustrates the packaging film product in accordance with the invention.

The edge borders 1a and 1b may be folded either in the way shown in FIG. 1, so that they meet at the middle of the transverse direction of the two-fold web, or alternatively as shifted by the width of the handle strip 2 towards the opposite edge of the two-fold web.

The handle strip concerned may be, in advance, provided with a tear perforation 5 between the grasping openings in view of facilitating the separating of the portion of film web required for each package. However, between each package unit, there is preferably additionally a second tear perforation 5' at the side of the above perforation 5. The tear perforation or perforations may, however, be omitted in advance, and be prepared only at the packaging stage, at which stage the packaging film web is even otherwise, as a rule, perforated in the transverse direction so as to separate the subsequent package blanks from each other in the packaging equipment before ultimate closing of the packages.

Figure 2:
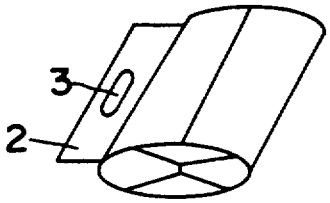
FIG. 2 illustrates a finished product package packaged into the film product concerned and FIG. 3 illustrates another embodiment of the packaging film product in accordance with the invention.

When the packaging film concerned is used, it can be fed, e.g., from a roll or from a folded bundle into the packaging equipment, wherein its run is guided so that the film first forms a tube open at one side, into which the product group units, running one after the other along a particular conveyor track, are fed; hereupon the tube is controlled so that it is closed, so that the folds 1a and 1b overlap each other to some extent. Hereupon the edge borders are joined together within the overlapping area, e.g., by using hot sealing. The speed of progress of the product group units travelling along with the tube is accelerated to some extent after the joining of the longitudinal joint, whereby the units are detached from each other as the packaging film is cut into pieces along the transverse perforations made between the units. After the separation, the path of movement of the individual units is deviated by about 90°, whereupon the portions of film web extending beyond the ends of the packages are folded so that they cover the ends, and are sealed together. The result is a package substantially in accordance with FIG. 2, which is provided with a handle 2 that has a grasping opening 3.

The packaging film product in accordance with the present invention may also be used in packaging machines of other types.

What is claimed is:

1. Packaging film product for forming package units for the packaging of paper rolls or corresponding products, wherein each package unit contains a product unit, comprising a film web having a middle area and edge border areas adjacent the middle area (1) and folded substantially over equal distances towards each other onto the middle area so that the edge border areas (1a, 1b) cover at least a substantial part of the middle area of the web, a longitudinal handle strip (2) formed by joining a portion of one of the edge border areas with the opposing portion of the film web, and grasping openings (3) in the handle strip, the grasping openings being spaced apart corresponding to the spacing of the package units.

2. Packaging film product as claimed in claim 1, wherein the grasping openings (3) define edge zones, the grasping openings formed by means of a heated tool for joining the film layers together at the edge zones of the openings.

3. Packaging film product as claimed in claim 1, wherein the grasping openings are linear cuts made into the handle strip (2).

4. Packaging film product as claimed in claim 1, wherein the handle strip (2) has at least one transverse perforation (5) between the package units.

5. Packaging film products as claimed in claim 1, wherein the grasping openings are linear perforations made into the handle strip (2).

*6. An article of manufacture including a continuous web of a film for use in the manufacture of discrete packages each adapted to hold at least one product, said article of manufacture comprising:*

*a continuous web of film folded over itself along a longitudinally extending fold line to form thereby a first longitudinally extending area having a first free edge and having a second free edge;*

*said first area and said second area being joined longitudinally along a seam spaced but adjacent to said fold line to form thereby a continuous handle strip, said first and second free edges being spaced from said seam and said fold line, said handle strip having formed therein a plurality of spaced grasping openings whose longitudinal spacing corresponds to the intended width of each discrete package;*

*said first edge of said first area comprising means for securing said first area longitudinally along the film web with said second free edge of said second area; and*

*a plurality of demarcating means spaced longitudinally along the length of the web and spaced apart a distance corresponding the intended width of each package, said demarcating means adapted to facilitate separation of said discrete packages.*

* * * * *

UNITED STATES PATENT AND TRADEMARK OFFICE

CERTIFICATE OF CORRECTION

PATENT NO. : RE 34,323

DATED : July 27, 1993

INVENTOR(S) : Veijo Heikkinen

It is certified that error appears in the above-indentified patent and that said Letters Patent is hereby corrected as shown below:

Please insert the following under [64], after "Filed: May 3, 1985":

Item [86]

PCT No.: PCT/FI85/00043

§ 371 Date: January 9, 1986

§ 102(e) Date: January 9, 1986

[87] PCT Pub. No. WO85/05086

PCT Pub. Date: November 21, 1985

[30] Foreign Application Priority Data

May 9, 1984 [FI] Finland. . . . . .841854

Signed and Sealed this

Twelfth Day of April, 1994

Bruce Lehman

*Attest:*

BRUCE LEHMAN

*Commissioner of Patents and Trademarks*

*Attesting Officer*